United States Patent Office 3,447,819
Patented June 3, 1969

3,447,819
PUSH-PULL CONNECTOR HAVING COMBINED SEAL AND LOCKING RING
Adolph W. Borsum and William K. Borsum, both of 521 Pacific Ave., Solana Beach, Calif. 92075
Filed Dec. 30, 1966, Ser. No. 606,465
Int. Cl. F16l 17/00, 33/16
U.S. Cl. 285—111                                7 Claims

ABSTRACT OF THE DISCLOSURE

A push pull connector including a male connector element, a female connector element adapted to receive the male connector element, peripheral depressions in each of the connector elements, a resilient element which extends between the depressions and acts as both a lock and a seal, and a ring-shaped disconnect member which is adapted to slide along the male element and cause disengagement of the lock-seal member from the male element. Connection is made by bringing the male and the female elements together; disconnection may be made by pushing the connector elements together and then pulling them apart.

---

The invention described herein may be manufactured and used by or for the Government of the United States of America for governmental purposes without the payment of any royalties thereon or therefor.

BACKGROUND OF THE INVENTION

Field of the invention

This invention relates to a connector or coupling and more particularly to a connector that may be easily and quickly changed from a connected to a disconnected position by a push-pull action.

Description of prior art

Numerous attempts in the past have been made to devise various types of connectors for various situations. For certain applications it is desirable to have connectors which are easily put together in a connecting position and which allow easy and quick disconnection. A good example of such a device is found in a patent issued to G. W. Goodwin, Patent No. 3,177,018, wherein a snap ring acts as a holding member between a male element and a female element of the connector. Nevertheless, while much work has been done in the connector field, certain disadvantages still exist and are common to prior art devices. Almost all prior art devices are somewhat complicated, therefore, overly expensive and difficult to operate. Thus, because of expense and/or complication, such connectors or couplings cannot be used in many commercial applications.

Summary of the invention

The present invention solves many of the difficulties of the prior art by providing an excellent connection while not requiring a very complicated structure. The present invention is very economical to construct and also extremely easy to use, allowing it to be placed in applications that have always desired such a connector but because of cost or other reasons could not warrant its use. While the present invention achieves a breakthrough in the connector, coupling art, it does not bring with it any new disadvantages. The above advantages are achieved by providing a push-pull connector comprised of male and female connector elements with the male element being adapted to be received by the female element. Each of the elements are adapted to receive an expandable, resilient element which will engage each of the elements in peripheral depression upon connection and disengage one of the elements upon disconnection, and a slidable element which is movable to force the resilient element from a connected to a disconnected position. In a preferred embodiment the resilient element may comprise a generally U-shaped cross section sealing ring which acts as both a lock and a seal for the connector.

It is an object of the present invention to provide a push-pull connector which may be quickly connected and disconnected.

Another object is to provide a push-pull connector which is extremely easy to operate such that little mechanical skill is necessary.

Still another object of the present invention is to provide a push-pull connector which is simple and inexpensive to construct so that it may find uses in heretofore cost restricted applications.

Yet another object of the present invention is to provide a push-pull connector which has positive holding and sealing characteristics in spite of its inexpensive construction.

A further object is to provide a push-pull sealable connector wherein male and female elements can be connected by a push together and relatively rotated after connection without breaking the seal, and can be disconnected alternatively by either pushing the elements together and pulling them apart, or by moving the slidable element only without moving the male and female elements toward one another and then pulling the elements apart.

DESCRIPTION OF THE PREFERRED EMBODIMENT

Figure 1:
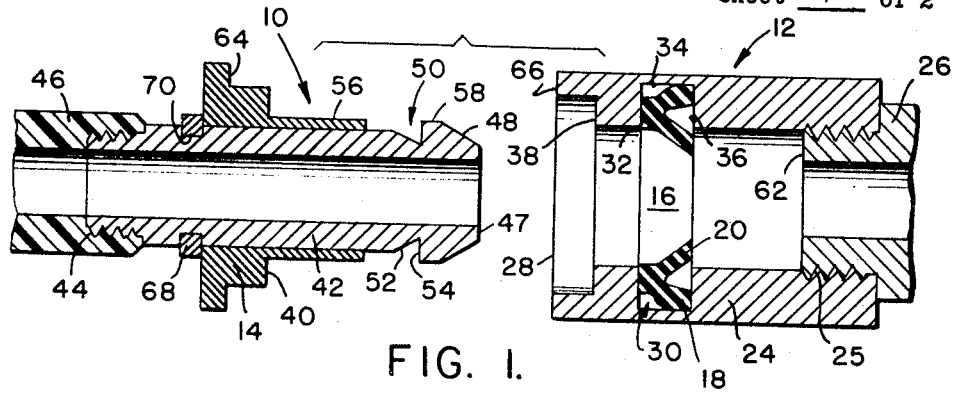
FIG. 1 is a side sectional view of a preferred embodiment of the invention in a disconnected position.

Referring now to the drawings wherein like reference numerals designate like or corresponding parts throughout the several views, there is shown in FIG. 1 a preferred embodiment of the present invention which may include a male connector element 10, a female connector element 12, a slidable disconnect element 14, and an expandable, resilient element 16 within the female connector element 12.

Figure 2:
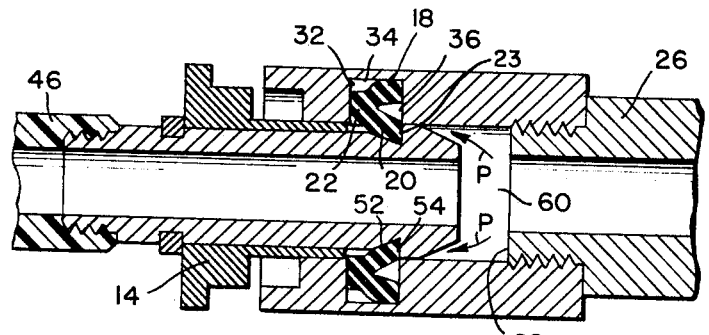
FIG. 2 is a side sectional view of the preferred embodiment in a connected position.
Figure 3:
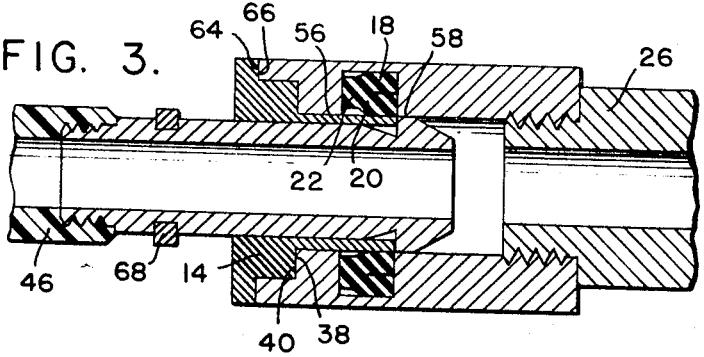
FIG. 3 is a side sectional view of the preferred embodiment illustrating the disconnecting operation.
Figure 4:
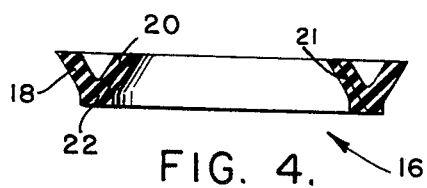
FIG. 4 is a side sectional view of a preferred embodiment of a locking and sealing element.
Figure 5:
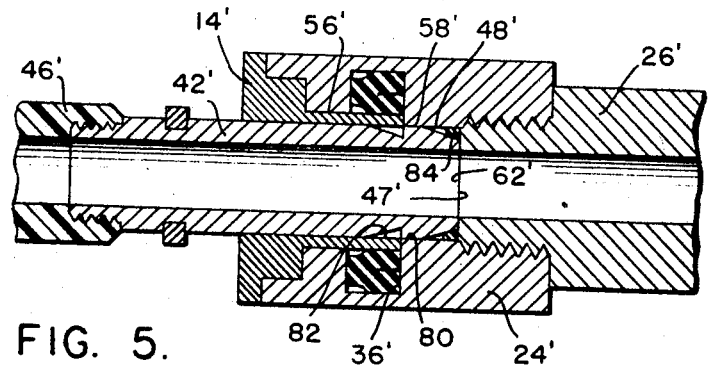
FIG. 5 is a side sectional view of a second preferred embodiment illustrating the disconnecting operation.
Figure 6:
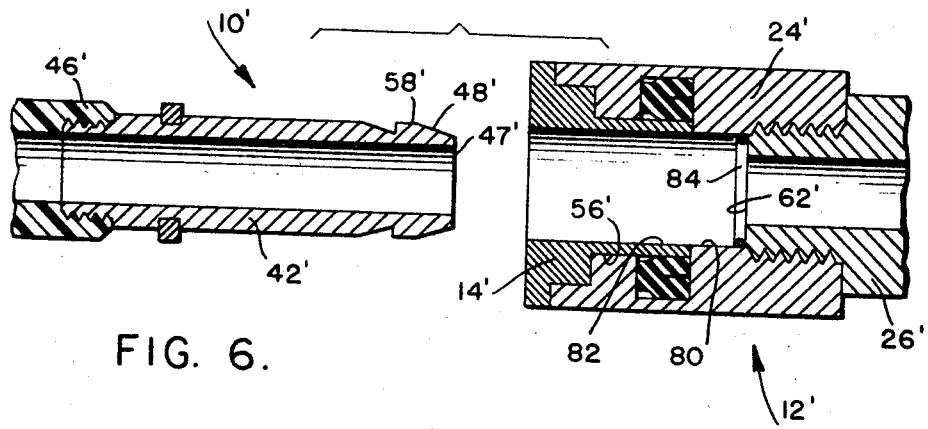
FIG. 6 is a side sectional view of the second preferred embodiment in a disconnected position.

The expandable, resilient element 16 may be of a resilient material and configured in cross-section, as shown in FIG. 4, to have two leg portions, external leg 18 and internal leg 20. The legs are connected at a base portion 22 so that a generally U-shaped cross section is formed. In the preferred embodiment the resilient element is mounted in the female connector element 12 so that the legs 18 and 20, leg 20 being an inner periphery, are generally parallel to the longitudinal axis of the connector elements as shown in FIGS. 2, 5 and 6. Being made of resilient material allows the legs 18 and 20 to pivot in a generally transverse direction about the base 22 so that if there is an application of force upon the legs, the leg 20 will pivot toward leg 18 to assume the position shown in FIG. 3.

The expandable, resilient element serves a dual function in the preferred embodiment in that it acts as the locking means between the female and male connector elements and it also acts as the sealing means between the two elements to prevent the escape of line pressure which may be built up within a system using the connector. Another advantage of using resilient element 16 in a configuration shown is that it is inexpensive, commercially available, and of a generally simple construction. Thus, as a member of the entire connector combination it helps to lower the cost of the connector so as to increase its already wide application. In the configuration shown for the preferred embodiment the resilient element may be purchased from the Parker Seal Company of Culver City, Calif. and Cleveland, Ohio and is designated by that company as "U-packing Seals." The "U-packing Seals" may be purchased in a variety of materials and sizes depending upon individual needs.

While the configuration shown in FIG. 4 for the resilient element 16 has been found to work very well in the preferred embodiment, it is pointed out here that the configuration shown is not the only configuration which may be used; numerous other configurations will work and individual needs may dictate such other configurations. As an example, a configuration having a parallelogram cross section (not shown) may be useful. Any particular coss section chosen may have wires 21, FIG. 4 embedded within the element to give it added strength. Such wires would be placed along a line as defined by leg 20 of the preferred configuration, FIG. 4. Again, it must be mentioned that all of the configurations and materials may be commercially available and are relatively inexpensive.

Female connector element 12, as shown in FIG. 1, may be comprised of a generally tubular body 24, one end being threaded at 25 so as to enable connection to a threaded conduit 26 which may be a hose or pipe or other fluid or wire carrying device. The opposite end 28 is adapted to receive in a longitudinal manner the male connector element 10 so that a connection between the two connector elements can be accomplished, as shown in FIG. 2. The bore of tube 24 has a peripheral depression, such as annular grove 30, which may be of a generally rectangular cross section and having three circular walls 32, 34 and 36. The walls are so constructed and dimensioned to receive and coact with the resilient element 16. In the preferred embodiment the resilient element 16 may be received within groove 30 with a slight squeeze upon leg 18 as it abuts wall 34 while base 22 abuts wall 32 so that a positive seal is achieved. Leg 20 at the inner periphery of the resilient element may extend somewhat beyond the groove wall 36 in a position to engage with the male connector element 10. The base 22 and leg 18, as shown in FIGS. 1 and 2, may be entirely disposed within the annular groove 30 so that the slidable disconnect element 14 can slide past the base to contact and pivot the leg 20.

It is to be noted that the female connector element 12 is not very complicated in structure and is, therefore, inexpensive to manufacture. There are no requirements for vary close tolerances. Another advantage derived from a simple structure is that conduit 26 may be made integral with the female connector element which, in certain cases, may provide a further savings in cost. While the preferred embodiment shows resilient element 16 initially placed within groove 30 of the female connector element, it is not absolutely essential that the resilient element be so disposed; by reversing the groove structure, that is, groove 30 being formed in the male connector element and the depression (designated 50 below) being formed in the female connector element, the resilient element may be disposed about the male connector element 10 when using such a configuration makes this disposition desirable.

Male connector element 10 may be comprised of a tubular member 42 which may have one end threaded at 44 providing a suitable connection to a threaded conduit 46. The threaded connections 25 and 44 are not to be limiting as any other suitable connecting configuration or means may be used with the proposed invention. The opposite end 47 of male connector element 10 may be tapered at 48 so as to help guide and center the male connector element as it enters the female connector element in a generally longitudinal direction. Closely spaced to the taper 48 may be a peripheral annular depression 50 having slanted wall 52 and base wall 54 which are adapted to engage the internal leg 20 of the resilient element 16 when the male and female connector elements are in their connected position, as shown in FIG. 2. The base wall 54 projects slightly beyond the outer diameter of the tubular member 42 to form diameter 58 so that it may act as a stop means for the slidable disconnect element 14. Base wall 54 extends far enough so that when the disconnect element 14 is in a forward position as shown in FIG. 3 (as opposed to its rearward position as shown in FIGS. 1 and 2), an outer periphery 56 of the disconnect element 14 has a diameter substantially equal to the diameter 58 of the male element, providing a generally continuous flush surface when disconnect element 14 is in its forward position.

Again, as is true of the other elements of the invention already mentioned, the male connector element is extremely simple in design and therefore relatively inexpensive to manufacture. As was mentioned with regard to the female connector element, the male connector element may also be made integral with its conduit 46 if a particular application makes such integral manufacture desirable.

As best seen in FIG. 2, when the male and female connector elements are in a connected position the resilient element 16 acts as a lock and as a seal. Line pressure which may be present within the fluid carrying conduits tend to act in a direction shown by the arrows (designated by P at 60 in FIG. 2) and have two effects: (1) there is a tendency for the pressure to force the two connector elements apart, (2) and there is a tendency for the pressure to force itself past a locking means and escape to the surroundings which is at a lower pressure. The resilient element 16 of the present invention prevents such occurrences and even provides protection in case of a reverse pressure gradient caused by a sudden partial vacuum within the conduits. In its locking position any force which tends to separate the connector elements, i.e., tends to push the elements from a FIG. 2 position to a FIG. 1 position, is transmitted from the base wall 54 of the male connector element 10 to leg 20 of the resilient element 16 and thence to the base 22 of the resilient element where the base is backed by wall 32 of the female connector element. In other words, leg 20 is placed generally in compression or under a compressive load; a separating force acts on one end 23 of the leg 20 and along a hypothetical slanted line generally to the left and upward in FIG. 2 (when viewing only the upper cross section view of element 16), which a resisting force acts upon the base 22 along the same line generally to the right and downward in FIG. 2. Hence, an effective lock is achieved. As mentioned earlier, it may be desirable to place metal wires within leg 20 to give added strength. As a seal, resilient element 16 prevents pressure escape because, as constructed and placed within groove 30, pressure will exert itself between legs 18 and 20 and cause the resilient element to bear more firmly against the male and female connector elements, i.e., leg 18 will be firmly pressed against wall 34, base 22 will be firmly pressed against wall 32 and leg 20 will be firmly pressed against wall 52.

It is noted that by constructing the lock-seal resilient element of a resilient material the resilient element may act as a shock absorber against sudden line pressure surges. It is also noted that the conduits 26 and 46 may carry electrical wiring with appropriate end plugs within the male and female connector elements 10 and 12 so as to allow quick connect and disconnect electrical circuitry. Such circuitry would not usually have excessive pressures within the conduits but yet many applications require, for safety reasons, that the electrical connections be able to lock connect. Such requirements exist in naval ship construction, for instance. The embodiments shown have the ability to lock and also to seal against moisture — moisture being highly undesirable within electrical conduits.

Disconnect element 14, which acts as a depressor means, may be comprised of a tubular section having various diameters along its length as desired. As stated before, it is preferable to have periphery 56 of the same diameter as that at 58 of the male connector element so as to present a substantially smooth, flush surface when the disconnected depressor means is in its forward position as shown in FIG. 3. It may be desirable to slightly bevel periphery 56 at its forward end so as to avoid possible damage to the resilient element 16 when moving the disconnect element into its forward position. The disconnect depressor means 14 may have annular faces 40 and 64 adapted to slidably engage annular faces 38 and 66 of the female connector element to provide alignment for the male connector element as it enters the bore of the female connector element. The sliding motion of the disconnect depressor means 14 occurs in a spacing between the connected elements 10 and 12 and is limited by the base wall 54 of the male element when in its forward position and by a stop means which may be a snap ring 68 when the depressor means is in its rearward position. Snap ring 68 may be conveniently attached to the male depressor element such as by snapping it into annular groove 70.

It should be noted that the disconnect depressor means 14 may be of any desirable configuration as long as the above required restrictions are adhered to and, in fact, may be disposed within the female connector element so as to remain with the female element when in a disconnected position (as shown in FIG. 6). One advantage to be gained by such a configuration may be protection of the lock-seal resilient element 16 if the depressor means is designed to cover the resilient element as shown in FIG. 6. Another advantage achieved with a FIG. 5 (and 6) configuration is that a vacuum within the line will not cause the male and female elements to come together and disconnect themselves. A still further advantage of the FIG. 5 (and 6) configuration is that the disconnect element 14' will not be susceptible to damage from contacting foreign objects. Therefore, protection is afforded the resilient element and the disconnect element.

The FIG. 5 embodiment differs from the FIG. 3 embodiment in a few respects. The basic elements, such as conduit 46', tubular member 42', disconnect element 14', tubular body 24' and conduit 26', are present. Periphery 56' is the same diameter as periphery 56 of the FIG. 3 embodiment, however, diameter 58' is not substantially equal to periphery 56'. Instead circular wall 36' is extended transversely to provide a stop means to the forward movement of disconnect element 14' and to provide a diameter such that inner surface 80 of the tubular body 24' is substantially flush with surface 82, the inner diameter of the disconnect element 14', when the disconnect element 14' is in its forward position as shown in FIGS. 5 and 6. In addition, conduit end 62' is extended to abut end 47' of the male connector element so that the male connector element cannot be pulled further into the female connector element by a line vacuum to cause an unwanted disconnection. An O-ring 84 may be added between taper 48' and conduit end 62' if desired.

The disconnecting operation of the FIG. 5 embodiment is achieved by moving the disconnect element 14' from a rearward position (similar to the position of disconnect element 14 in FIG. 2) to a forward position as shown in FIG. 5. The forward movement of disconnect element 14' causes disengagement of the male connector element and allows a pulling motion to complete disconnection of the male and female elements to achieve a FIG. 6 configuration.

Under certain circumstances it might be desirable to have the disconnect means 14 or 14' split into halves so that it may be conveniently used as a tool; that is, until it is desired to have separation of the connector elements the disconnect means may be removed completely and used elsewhere.

When the depressor means 14 is in its forward position abutting base wall 54, FIG. 3, a transverse force is placed upon the internal leg 20 of the resilient element causing said leg to be pivoted transversely toward leg 18 and out of engagement with the peripheral depression 50 of the male connector element. It is noted that movement of the resilient element during connection and disconnection of either embodiment is generally transverse with no movement in the longitudinal direction as is common to most prior art connectors. When in the configuration as shown in FIG. 3, the resilient element 16 is defined to be in an expanded condition since the resilient element is forced firmly outward against the wall 34 even though in a popular sense the cross section of the resilient element is said to be contracted. When the resilient element is in its locking position it is defined to be in a contracted condition because leg 20 is pushed against wall 52 even though in the popular sense the cross section is expanded. Thus, for purposes of this application, when the inner and outer diameter of flexible element 16 is changed because of a transverse force from disconnect means 14, it is in an expanded condition and it is in a contracted condition when a transverse force is absent, as when the resilient element is locking the connector (similarly for the FIGS. 5 and 6 embodiment).

There are two methods of disconnecting the two connector elements (FIG. 3 embodiment) by the disconnect depressor means. One method is to move the disconnect depressor means 14 forward without the movement of either of the connector elements, as shown in FIG. 3, to cause the transverse force to disengage the resilient element 16 from the male connector element. The second method is to force the two connector elements together causing stop means 68 to bear against the disconnect depressor means 14 and push it until annular faces 64 and 40 abut respectively annular faces 66 and 38 of the female connector element and end 47 abuts face 62 which is so spaced to allow the periphery 56 to force leg 20 of the resilient element from engagement with the male connector element. Upon withdrawing the male connector element from the female connector element, base wall 54 will come into contact with the disconnect means 14 and cause the disconnect depressor means to be removed along with the male connector element. An advantage of having alternative disconnection procedure is that one method allows the male and female connector elements to remain stationary until actual disconnect is desired. This may be essential, for instance, if the conduits 26 and 46 are very bulky; the other method may be applicable if the apparatus is small and lightweight.

OPERATION

Operation of the connector is extremely simple. It takes little or no mechanical ability and, therefore, achieves one of its major advantages over previous connectors. The connected and disconnected positions of the male and female connector elements 10 and 12, respectively, are best shown by viewing FIG. 1 in which the elements are separated and in a disconnected condition, then going to FIG. 2 in which the elements are in a connected or engaging position, then to FIG. 3 in which disconnection has begun by having the disconnect depressor means 14 in a forward position. The final step of disconnection consists of pulling the male and female elements apart which would return the elements to a configuration shown in FIG. 1. With the male and female connector elements shown as in FIG. 1, connection is simply made by having the female connector element 12 receive the male connector element 10 within its bore. As the male connector element penetrates into the female bore the taper 48 of the male connector element causes leg 20 of the resilient element 16 to be pivoted transversely out of its way until annular depression 50 is disposed opposite the resilient element 16. When this occurs the leg 20 will pivot back into engagement with wall 52 causing a connection to be made. Any pressure or forces tending to remove the male connector element causes the base wall 54 to press against leg 20 transmitting the force from the male connector element to the leg of the resilient element and then to its base 22 before being transmitted to the female connector element by way of wall 32. If it is pressure that is causing the tendency to separate, it also causes the resilient element to act as a seal by forcing the legs 18 and 20 into more intimate sealing contact with the walls 34 and 52, respectively. Hence, an effective lock and an effective seal are achieved by using one very simple, inexpensive and readily commercially available element.

When disconnection is desired one of two things may be done: slide the disconnect depressor means from its rearward position to its forward position causing it to place a transverse force upon the resilient element 16 resulting in leg 20 being pivoted toward leg 18 until the resilient element achieves its expanded condition as shown in FIG. 3. Since there is a biasing force from the resilient element 16 to have itself returned to its position as shown in FIG. 1, a frictional force will be placed upon the disconnect depressor means 14 to keep it in its forward position until purposefully withdrawn. This first means of disconnect allows the male and female connector elements to remain perfectly stationary, thus being of significant benefit in those situations in which it is undesirable or impossible to move the conduits 26 and 46 toward each other. The second method of disconnect is by causing the male and female elements to come together by having snap ring 68 abut the disconnect means causing it to apply the transverse force against the resilient element 16 as was done in the first disconnect operation. This means of disconnect is extremely valuable when the conduits 26 and 46 are small and easily carried by hand since a disconnect operation would consist simply of pushing and then pulling, that is, pushing the male and female elements together to cause the disconnect depressor means to disengage the resilient element and then pulling the two connector elements apart. The FIG. 5 embodiment connects like the FIG. 3 embodiment, however disconnection of the FIG. 5 embodiment is by the first method only. That is, the disconnect means 14' slides forward to disengage the male connector element 10'.

As can be seen, there is little or no mechanical skill necessary to connect and disconnect the present invention because it is easy and simple in operation. There is no special connecting position which the connector elements must assume and there is a 360° relative freedom between the elements allowing kinks or twistings in the conduits 26 and 46 to be easily removed. In addition, the 360° freedom of rotation allows a rotating motion to be accomplished at the connection making for considerable freedom of movement if so desired. All of the above has been achieved by elements that are relatively simple and inexpensive to manufacture and which lend themselves to a variety of different types of manufacture; that is, the elements may be made of metal, plastic or any other desired material consistent with the operation in which it is to be used. Thus, the inexpensive manufacture and the simplicity of use achieved by the present invention enables its use in a great many applications.

Obviously many modifications and variations of the present invention are possible in the light of the above teachings. It is therefore to be understood that the invention may be practiced otherwise than as specifically described.

We claim:
1. A push-pull connector comprising:
 a rod-like male connector element having an elongate body portion and a head portion;
 a female connector element having a bore for receiving longitudinally said male element, the relative sizes of said head portion and of an inner extent of said bore portion providing substantially a flush engagement of said head with a portion of said inner extent, said engagement positioning and stabilizing said male element;
 each of said connector elements having an annular peripheral depression;
 an annular resilient element comprising a base portion disposed in a radially and axially fixed position wholly within the depression of one of said connector elements in contact with an outer wall of said depression and an elongate annular leg portion;
 said leg portion being normally biased into a contracted position in which it projects radially from its fixed base portion into said bore and the projecting extent of said leg portion being sized, shaped and biased for engaging and for terminating within the peripheral depression of said other of the connector elements whereby a force tending to separate said connector elements places said elongate leg portion in compression for interlocking said elements and for effecting a sealable engagement between the leg portion and its peripheral depression;
 said leg portion further being pivotable about its fixed base portion from said biased position into an expanded position in which it is disposed substantially within the peripheral depression of said one connector element, and
 a disconnect element slidable along the connector elements for so pivoting said leg portion whereby said interlock is released and said connector elements can be separated;
 the relative sizes of a portion of said female connector bore and said male connector body portion providing space for said slidable disconnect element.

2. A push-pull connector as claimed in claim 1 wherein:
 the resilient element has a generally U-shaped cross section and is disposed with its legs generally parallel to the longitudinal axis of the connector elements when in an expanded condition.

3. A push-pull connector as claimed in claim 1 wherein:
 the peripheral depression of the female connector element is within the bore thereof and comprises an annular groove;
 the peripheral depression in the male connector element comprises an annular groove; and
 the resilient element is mounted within the annular groove of the female connector element.

4. A push-pull connector as claimed in claim 3 wherein:
 the connector elements are tabular,
 the male connector element has an annular base wall which extends radially beyond the periphery of the male connector element; and
 said leg having an end which sealably engages said base wall when the leg is in said contracted condition and said disconnect element having an end which is engageable with said base wall when the leg is in said expanded condition.

5. A push-pull connector as claimed in claim 1 wherein:
 the peripheral depression is within the bore of the female connector element and comprises an annular groove;
 the peripheral depression in the male connector element is an annular groove; and
 the disconnect element is slidably disposed about the periphery of the male connector element and engages the male connector element to remain with the male connector element when said connectors are disconnected.

6. A push-pull connector as claimed in claim 5 wherein:
 the resilient element is mounted within the annular groove of the female connector element.

7. A push-pull connector as claimed in claim 1 wherein: the resilient element includes a strengthening wire within its leg.

References Cited

UNITED STATES PATENTS

| | | | |
|---|---|---|---|
| 2,529,098 | 11/1950 | Noll | 227—205 X |
| 2,914,345 | 11/1959 | Osborn | 285—110 |
| 1,490,716 | 4/1924 | Schwennker | 285—111 X |
| 2,127,086 | 8/1938 | McGrath | 285—105 |
| 2,465,197 | 3/1949 | Chatham | 285—105 X |
| 3,027,179 | 3/1962 | Wiltse | 285—321 |
| 3,272,538 | 9/1966 | Bergstrom | 285—321 X |

FOREIGN PATENTS

| | | |
|---|---|---|
| 692,526 | 8/1964 | Canada. |
| 40,031 | 7/1887 | Germany. |
| 167,534 | 4/1956 | Australia. |
| 556,838 | 2/1957 | Italy. |

THOMAS F. CALLAGHAN, *Primary Examiner.*

U.S. Cl. X.R.

285—315, 321; 277—9, 205